United States Patent [19]
Yajima

[11] Patent Number: 5,884,107
[45] Date of Patent: Mar. 16, 1999

[54] LENS CONTROLLER

[75] Inventor: Shinya Yajima, Omiya, Japan

[73] Assignee: Fuji Photo Optical Co., Ltd., Omiya, Japan

[21] Appl. No.: 925,797

[22] Filed: Sep. 9, 1997

[30] Foreign Application Priority Data

Sep. 17, 1996 [JP] Japan .................................. 8-244960

[51] Int. Cl.⁶ .................................................. G03B 3/10
[52] U.S. Cl. .......................... 396/86; 396/131; 348/357; 348/358
[58] Field of Search ............................. 396/85–87, 131; 348/240, 357, 358

[56] References Cited

U.S. PATENT DOCUMENTS 5,493,357  2/1996  Hara et al. ................................. 396/85

Primary Examiner—W. B. Perkey
Attorney, Agent, or Firm—Sixbey, Friedman, Leedom & Ferguson; David S. Safran

[57] ABSTRACT

A signal determining circuit determines the voltage of a control signal which is output according to a rotational angle of a thumb ring. When the determined voltage of the control signal is lower than a predetermined cutoff voltage, an armature of a switch means is made to contact a point of contact which is grounded, so that the control signal can be interrupted. On the other hand, when the determined voltage of the control signal is higher than the cutoff voltage, the armature of the switch means is made to contact the other point of contact so as to input the control signal to a driving circuit, and a servo motor is driven according to the control signal, so that a zoom lens can be moved to the tele side or the wide side. Thereby, it is possible to prevent the lens from operating incorrectly and to effectively eliminate an unstable area in a circuit which has a wide dynamic range.

4 Claims, 4 Drawing Sheets

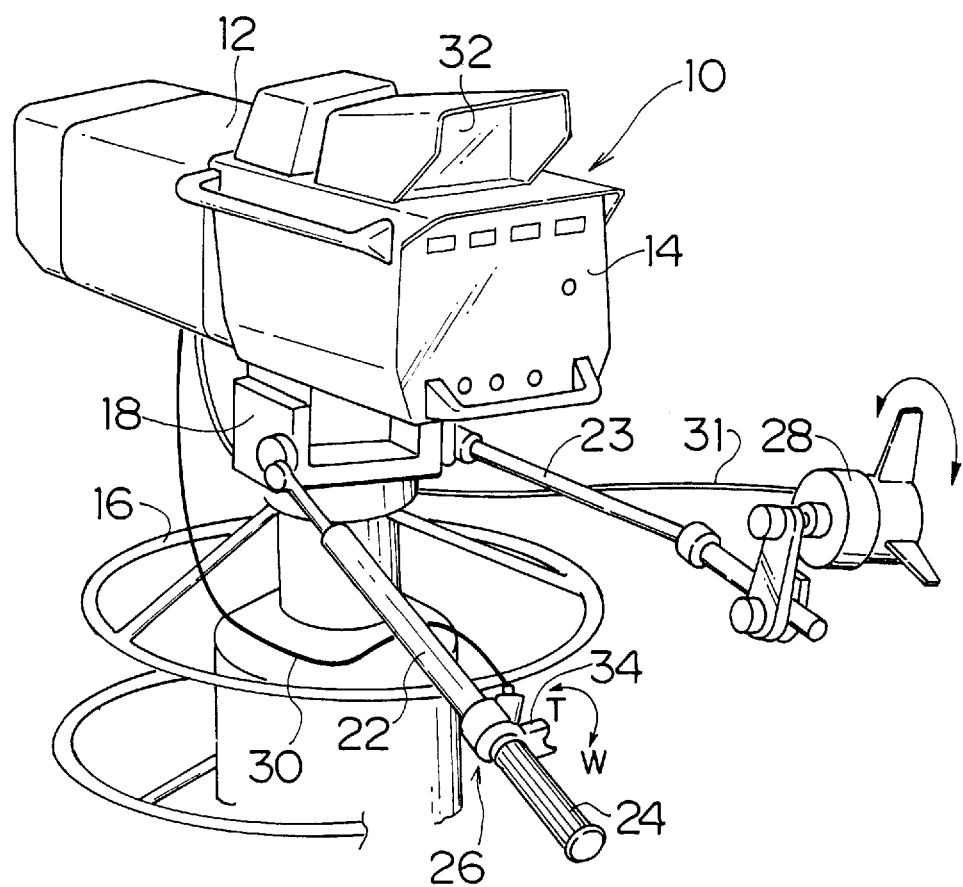
F I G. 1

LENS CONTROLLER

BACKGROUND OF THE INVENTION

1. Field of the Invention

The present invention relates generally to a lens controller, and more particularly to a lens controller which generates control signals for controlling a broadcast zoom lens used for a studio camera, a field camera, and the like.

2. Description of Related Art

Zoom speed controlling is usually performed in order to control the zooming of a large-sized lens by a servo-control for a studio camera and a field camera. A user performs the zooming operation by rotating a thumb ring of a zoom controller, which is attached to a grip of a pan/tilt handle. The zoom controller determines the rotational angle of the thumb ring by a potentiometer, and the direction in which the thumb ring is rotated from a neutral position determines the tele direction or the wide direction. The motor of the zoom lens is controlled so that as the rotational angle of the thumb ring increases, the zoom speed increases.

In a conventional zoom controller, however, the zoom controller must deal with a wide dynamic range (a wide variable range of the zoom speed) of which zoom speed ranges from a maximum speed for moving the lens over the whole movable range in a fraction of a second to a minimum speed for moving the lens over the whole movable range in several hundred seconds (e.g. 200 seconds). For this reason, the zooming must start when the control signal is several millivolts (mV). Thus, there is a problem in that the undesired zooming operation can occur due to small errors (displacement) and changes of the control signal, which are caused by the mechanical displacement of the potentiometer of the zoom controller, secular changes of the mechanical system in the zoom controller, drift of parts of the zoom controller, noise from the outside, and the like.

SUMMARY OF THE INVENTION

The present invention has been developed in view of the above-described circumstances, and has its object the provision of a lens controller which determines the value of a speed control signal and prevents a lens from operating incorrectly due to unnecessary signals except for the control signal.

To achieve the above-described object, a lens controller of the present invention which moves a lens by driving a motor so as to perform focusing operation and/or zooming operation comprises: an operation member for accepting a manipulation to move the lens; a signal generating means for outputting a control signal in accordance with a manipulated amount of the operation member; a signal determining means for determining a value of the output control signal; and a signal interrupting means for interrupting the control signal and prohibiting the motor from being driven in accordance with the control signal when the determined value of the control signal is less than a predetermined value, the signal interrupting means for validating the control signal and allowing the motor to be driven in accordance with the control signal when the determined value of the control signal is more than the predetermined value.

According to the present invention, when the determined value of the control signal is less than the predetermined value, the control signal is interrupted. Only if the determined value of the control signal is more than the predetermined value, is the lens allowed to operate in accordance with the control signal. Thereby, it is possible to prevent the lens from operating incorrectly according to an unnecessary signal of which value is less than the predetermined value, and the shooting can be performed under stable conditions as a result.

The present invention is particularly effective if the lens is speed-controlled in accordance with the manipulation of the operation member. If a setting changing means is provided which is able to change the setting of correlation between the manipulated amount of the operation member and the output value of the control signal, a dead zone is varied in the operation member according to the setting as a result.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view illustrating a broadcast television camera to which a lens controller of the present invention applies;

DETAILED DESCRIPTION OF THE PREFERRED EMBODIMENTS

Figure 2:
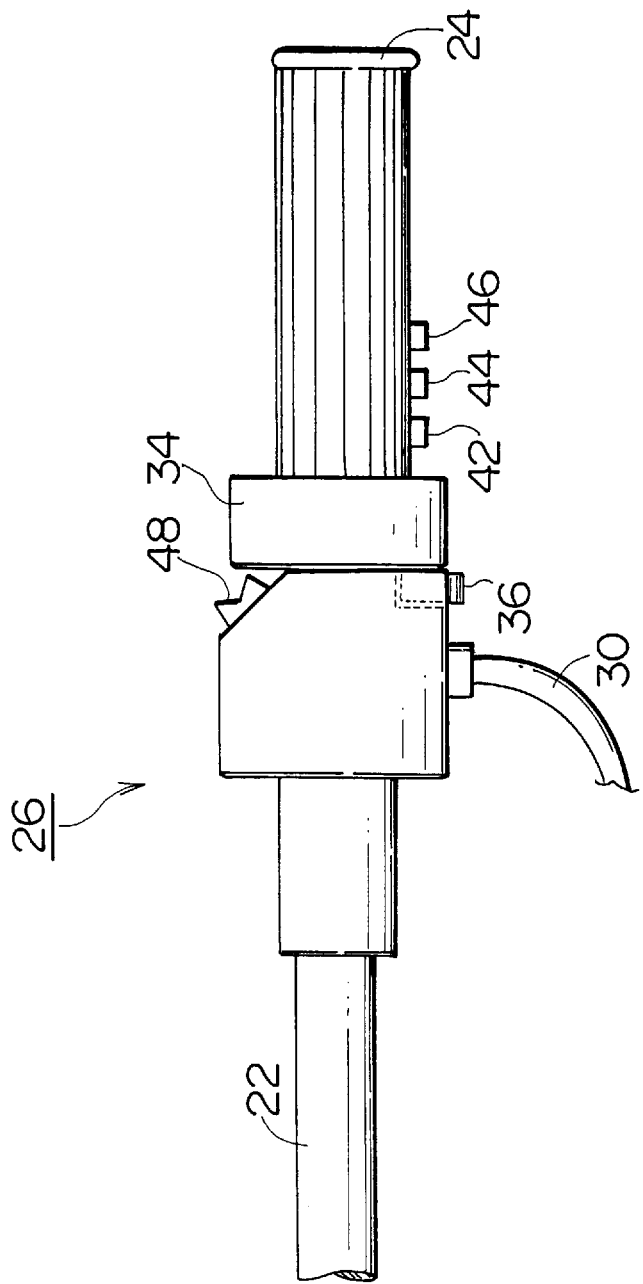
FIG. 2 is an enlarged side view of a zoom controller.

This invention will be described in further detail by way of example with reference to the accompanying drawings.

Referring to FIG. 1, a lens controller of the present invention is applied to a zoom controller which is used for a broadcast television camera. A television camera 10 in FIG. 1 consists of a lens part 12 and a camera part 14, and the camera 10 is fixed to a universal head 18 on a pedestal 16.

Two pan/tilt handles 22, 23 are extended from the universal head 18. A zoom controller (a zoom demand) 26 for controlling zoom speed is provided in proximity to a grip 24 of one pan/tilt handle 22, and a focus controller (a focus demand) 28 is attached to the other pan/tilt handle 23. The zoom controller 26 and the focus controller 28 connect to the camera part 14 or the lens part 12 via cables 30, 31, respectively. A user adjusts a focus point by manipulating a focus knob of the focus controller 28 with his right hand while looking at a shooting image on a view finder 32, and he manipulates a thumb ring 34 of the zoom controller 26 with his left hand to thereby adjust the zooming.

FIG. 2 is an enlarged side view of the zoom controller 26. The thumb ring 34 is rotatable about an axis of the grip 24, and the rotational angle of the thumb ring 34 is determined by a potentiometer (not shown). When the user rotates the thumb ring 34, the zoom controller 26 outputs a zoom speed control signal (a control signal) corresponding to the rotational angle. As described later with respect to FIG. 3, a servo motor 62 for driving a zoom lens 64 is controlled so that the zoom speed can be increased as the rotational angle of the thumb ring 34 is increased.

The rotational direction of the thumb ring 34 determines whether the zooming should be performed to the wide side or the tele side. For example, if the thumb ring 34 is rotated in the direction T in FIG. 1, the zoom lens moves to the tele side, and if the thumb ring 34 is rotated in the reverse direction (the direction W in FIG. 1), the zoom lens moves to the wide side.

The thumb ring 34 is pushed by a pushing member (not shown) in such a manner as to be positioned at a neutral position within a rotational range. If a thumb is moved away from the thumb ring 34, the thumb ring 34 rotates and returns to the neutral position.

A rotary dial member 36 is provided at the lower part of the zoom controller 26. The maximum zoom speed can be set by manipulating the dial member 36.

Three return switch members 42, 44, 46 are provided at the bottom of the grip 24 of the zoom controller 26. While the pan/tilt handle 22 is being operated, the return switch members 42, 44, 46 are turned on and off. The reason why there are a plurality of return switch members (three in this embodiment) is that a plurality of return electrical circuits are provided in the television camera so that the user can confirm, on the screen, an image on the air, an image which is shot by another camera, and the like.

An intercom switch member 48 is provided at the top of the zoom controller 26. The intercom switch member 48 is able to turn on and off an intercom for communication with an engineer and an intercom for communication with a producer. For example, the central position is a common OFF position, and if the intercom switch member 48 is put forward, the intercom for the engineer is turned on, and if the intercom switch member 48 is put backward, the intercom for the producer is turned on. The reason why the intercom is provided in two systems is to individually communicate with a plurality of speakers.

Figure 3:
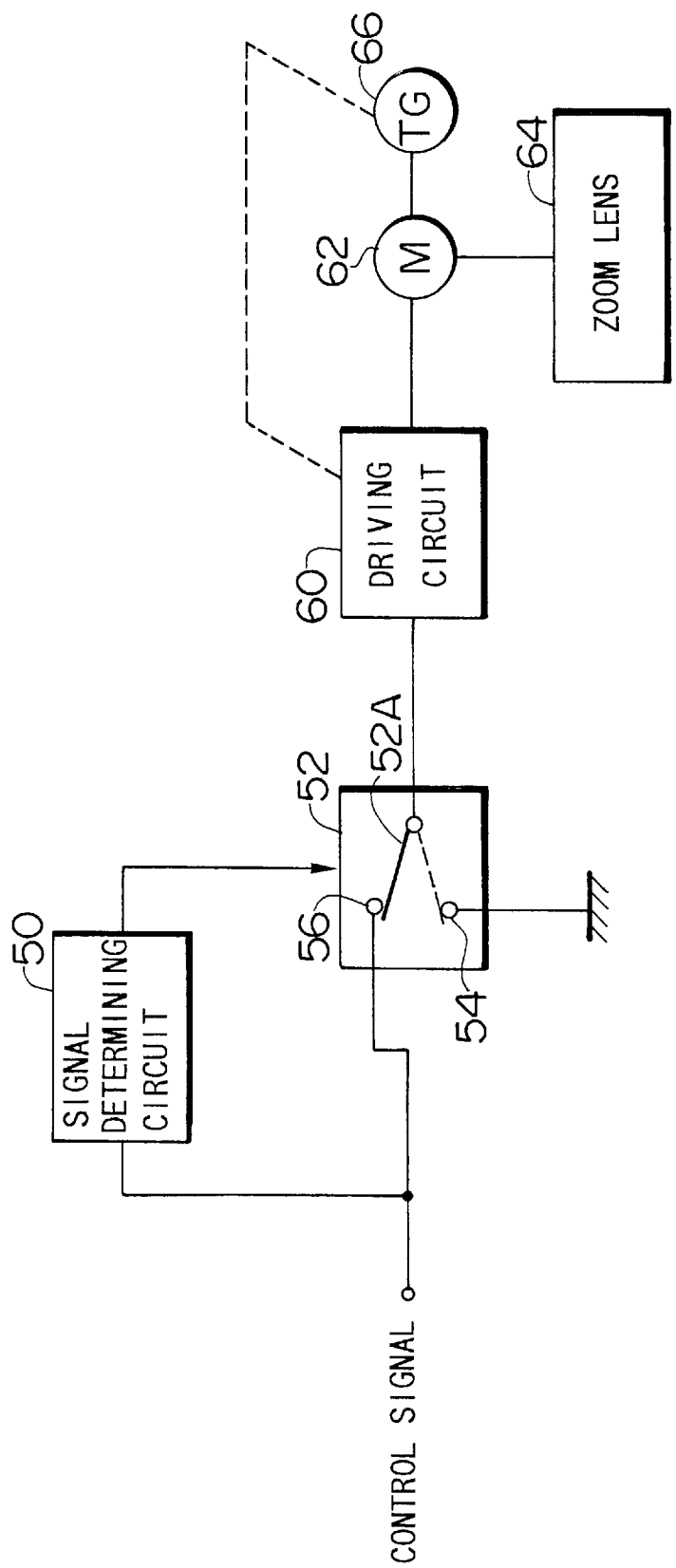
FIG. 3 is a block diagram illustrating a drive control system of a zoom lens.

FIG. 3 is a block diagram illustrating a drive control system of the zoom lens. The drive control system is provided with a signal determining circuit 50, which determines the voltage of the control signal, and a switch means 52, which moves an armature 52A according to the output of the signal determining circuit 50.

The signal determining circuit 50 determines the voltage of the control signal which is output from the zoom controller 26 according to the rotational angle of the thumb ring 34, and the signal determining circuit 50 outputs a switch signal for driving the switch means 52 in accordance with the results of the determination. If the voltage of the control signal is lower than a predetermined cutoff voltage, the armature 52A of the switch means 52 is made to contact a point of contact 54. In this case, the control signal is not input to the driving circuit 60, and thus the servo motor 62 does not rotate.

On the other hand, if the voltage of the control signal is higher than the cutoff voltage, the armature 52A of the switch means 52 is made to contact the other point of contact 56, and the control signal is input to the driving circuit 60. Thus, the servo motor 62 rotates according to the control signal, and the zoom lens 64 moves to the tele side or the wide side.

A tachogenerator 66 connects to the servo motor 62, and the tachogenerator 66 measures revolutions of the servo motor 62. A signal is supplied from the tachogenerator 66 to the driving circuit 60 in accordance with the results of the measurement, and the signal is used to control the speed of the servo motor 62.

Figure 4:
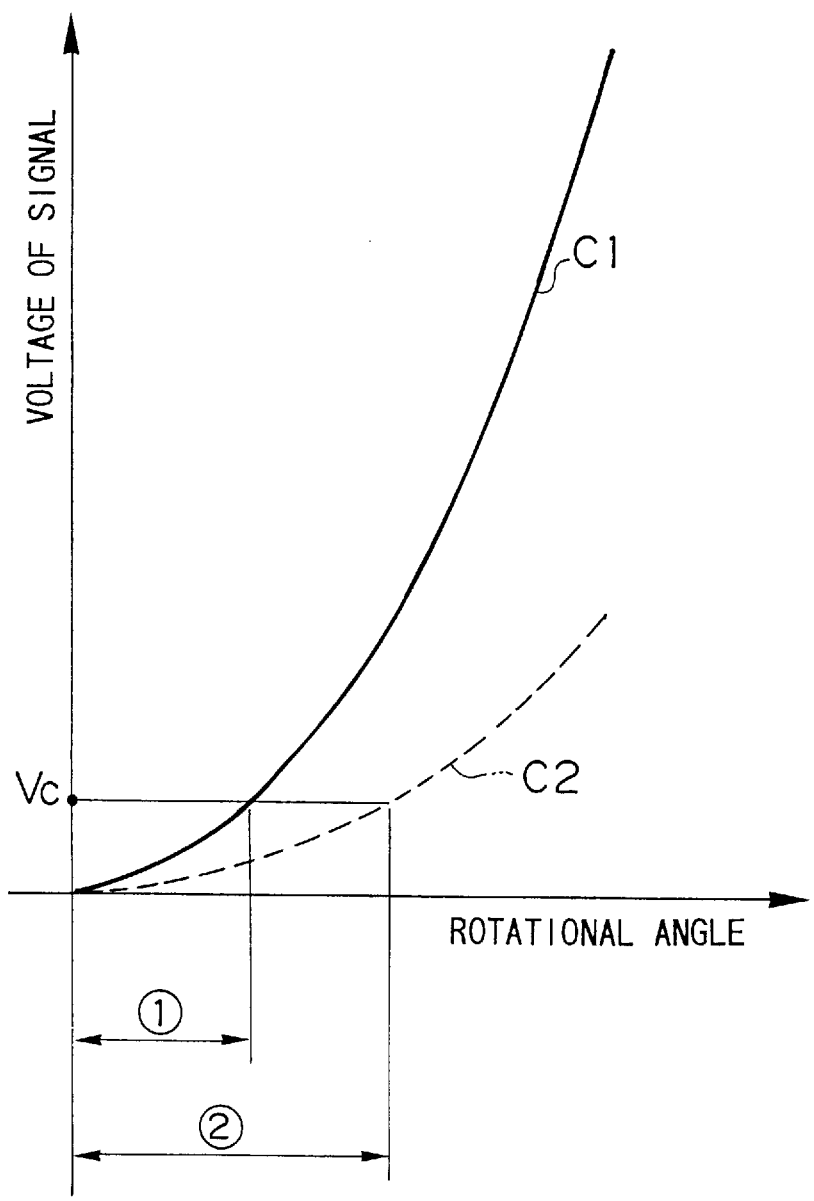
FIG. 4 is a graph showing correlation between a rotational angle of a thumb ring and a voltage of a control signal.

FIG. 4 shows correlation between the rotational angle of the thumb ring 34 and the voltage of the control signal output from the zoom controller 26. The correlation between the rotational angle of the thumb ring 34 and the voltage of the control signal differs according to the maximum zoom speed, which is set with the dial member 36: for example, the correlation is indicated by a curve C1 shown with a solid line or a curve C2 shown with a broken line. The maximum speed of the curve C1 is higher than that of the curve C2. FIG. 4 shows only the positive (plus) rotational angles, and it does not show the negative rotational angles. If, however, the rotational angle is negative, the control signal is also negative.

As described in FIG. 3, a cutoff voltage $V_c$ is predetermined for the signal determining circuit 50. If the voltage of the control signal is lower than the cutoff voltage $V_c$, the armature 52A of the switch means 52 contacts the point of contact 54, and the control signal is interrupted. If the voltage of the control signal is higher than the cutoff voltage $V_c$, the armature 52A of the switch means 52 contacts the point of contact 56, and the control signal becomes valid.

A dead zone for the curve C1 is formed on a range of rotational angles where the voltage of the control signal is lower than the cutoff voltage $V_c$, and the dead zone is indicated with ① in FIG. 4, and in the case of the curve C2, a dead zone is formed on a range which is indicated with ② in FIG. 4.

Next, an explanation will be given about the operation of the lens controller which is constructed in the above-mentioned manner.

First, when the maximum zoom speed is set by means of the dial member 36, the correlation between the rotational angle of the thumb ring 34 and the voltage of the control signal as shown in the curve C1 or C2 of FIG. 4, for example, is determined according to the setting.

The signal determining circuit 50 monitors the voltage of the control signal, and interrupts the control signal whose voltage is lower than the cutoff voltage $V_c$. Thereby, it is possible to prevent undesired zooming operation resulting from slight errors (displacement) and changes of the control signal, which are caused by the mechanical displacement of the potentiometer of the zoom controller 26, secular changes of the mechanical system in the zoom controller 26, drift of parts of the zoom controller 26, noise from the outside, and the like.

If the voltage of the control signal is higher than the cutoff voltage $V_c$, the signal determining circuit 50 determines that the thumb ring 34 has been certainly operated. Then, the armature 52A of the switch means 52 is made to contact the point of contact 56 (see FIG. 3), and the control signal is input to the driving circuit 60. Thus, the servo motor 62 is driven according to the control signal which was input to the driving circuit 60, and the zoom lens 64 is moved to the tele side or the wide side.

As stated above, according to the embodiment of the present invention, it is possible to prevent the incorrect operation of the lens, which is caused by an unnecessary signal of which value is less than a predetermined value (e.g. the cutoff voltage $V_c$), and thereby, the shooting can be performed under stable conditions. Moreover, in the case of a circuit which has a wide dynamic range, an unstable area can be effectively eliminated.

In the above-described embodiment, the present invention is applied to the zoom controller; however, the present invention may also be applied to a focus controller, and may be widely used for ordinary speed controlling circuits.

As set forth hereinabove, the lens controller of the present invention is provided with the signal interrupting means which determines the value of the control signal and interrupts the control signal of which value is less than the predetermined value so as to prevent the lens from operating. Thereby, it is possible to prevent the incorrect operation of the lens, which is caused by the unnecessary signal. Thus, it is possible to prevent the undesired operation of the lens, which is caused by an unexpected error (displacement), change, etc., so that the shooting can be performed under stable conditions.

Furthermore, according to the present invention, the unstable area can be effectively eliminated in a circuit which has a wide dynamic range.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A lens controller which moves a lens by driving a motor so as to perform focusing operation and/or zooming operation, said lens controller comprising:

an operation member for accepting a manipulation to move said lens;

electrical signal generating means for outputting an control signal in accordance with a manipulated displacement of said operation member;

signal determining means for determining a value of the output control signal; and signal interrupting means for interrupting the control signal and prohibiting said motor from being driven in accordance with the control signal when the determined value of the control signal is less than a predetermined value, said signal interrupting means validating the control signal and allowing said motor to be driven in accordance with the control signal when the determined value of the control signal is more than the predetermined value.

2. The lens controller as defined in claim 1, wherein said lens is speed-controlled according to the control signal.

3. The lens controller as defined in claim 1, further comprising setting changing means for changing a correlation between an output value of the control signal and the manipulated displacement of said operation member.

4. The lens controller as defined in claim 1, wherein said lens controller performs a focusing operation and/or zooming operation of a zoom lens which is used for a broadcast television camera.

* * * * *